(12) United States Patent
Guo et al.

(10) Patent No.: US 11,463,569 B2
(45) Date of Patent: Oct. 4, 2022

(54) STRUCTURAL COMPONENT AND MOBILE TERMINAL

(71) Applicant: Honor Device Co., Ltd., Guangdong (CN)

(72) Inventors: Renwei Guo, Beijing (CN); Xixiang Dai, Dongguan (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 196 days.

(21) Appl. No.: 16/768,494

(22) PCT Filed: Nov. 30, 2017

(86) PCT No.: PCT/CN2017/114000
§ 371 (c)(1),
(2) Date: May 29, 2020

(87) PCT Pub. No.: WO2019/104660
PCT Pub. Date: Jun. 6, 2019

(65) Prior Publication Data
US 2020/0374379 A1    Nov. 26, 2020

(51) Int. Cl.
*H04M 1/02*      (2006.01)
*H04B 1/03*      (2006.01)
*G06F 3/041*      (2006.01)

(52) U.S. Cl.
CPC ........ *H04M 1/0266* (2013.01); *G06F 3/0412* (2013.01); *G06F 2203/04103* (2013.01)

(58) Field of Classification Search
CPC ........ H04M 1/0266; H04M 1/02; H04M 1/03; H04M 1/0295; H04B 1/08; G06F 3/0412; G06F 2203/04103; G06F 1/1643; G06F 2200/1634; B32B 2457/00; B32B 3/30; B32B 5/18; B32B 2266/14; B32B 2307/546; B32B 3/08; B32B 5/22; B32B 7/05; B32B 7/12; B32B 17/06
See application file for complete search history.

(56) References Cited

U.S. PATENT DOCUMENTS 9,442,585 B2 *   9/2016   Park ................. G02F 1/136286
10,185,448 B2 *   1/2019   Zhang ................ G02F 1/13439
10,234,707 B2     3/2019   Matsuoka
(Continued)

FOREIGN PATENT DOCUMENTS

CN     105044991 A    11/2015
CN     105045347 A    11/2015
(Continued)

*Primary Examiner* — Andrew Wendell
(74) *Attorney, Agent, or Firm* — Conley Rose, P.C.

(57) ABSTRACT

A structural component includes a middle frame, a glass cover, and a touch control film. The glass cover and the touch control film are disposed in a stacked manner. The touch control film is disposed on a surface that is of the glass cover and that faces the middle frame, and a side edge of the touch control film and a side edge of the glass cover do not overlap completely. The glass cover is bonded using the first bonding adhesive, and the touch control film is bonded using the second bonding adhesive. The first bonding adhesive is bonded to an edge of the glass cover, and the bonding force of the first bonding adhesive is greater than the bonding force of the second bonding adhesive.

16 Claims, 5 Drawing Sheets

(56) References Cited

U.S. PATENT DOCUMENTS

| | | | |
|---|---|---|---|
| 10,440,841 B2* | 10/2019 | Tseng | H05K 5/0017 |
| 10,490,770 B2* | 11/2019 | Kim | H04M 1/0266 |
| 2012/0329249 A1* | 12/2012 | Ahn | H01L 24/94 |
| | | | 438/464 |
| 2013/0057485 A1 | 3/2013 | Lim | |
| 2015/0103053 A1 | 4/2015 | Lin et al. | |
| 2016/0313596 A1 | 10/2016 | Ai et al. | |
| 2017/0121573 A1 | 5/2017 | Bogner et al. | |
| 2017/0255382 A1* | 9/2017 | Ou | G06F 1/1626 |
| 2017/0364183 A1* | 12/2017 | Xiao | G06F 3/0447 |
| 2018/0150161 A1 | 5/2018 | Xu | |
| 2018/0292701 A1* | 10/2018 | Chien | G02F 1/1339 |

FOREIGN PATENT DOCUMENTS

| | | |
|---|---|---|
| CN | 205353978 U | 6/2016 |
| CN | 106155194 A | 11/2016 |
| CN | 106155195 A | 11/2016 |
| CN | 206061370 U | 3/2017 |
| CN | 206224339 U | 6/2017 |
| JP | 2003140800 A | 5/2003 |
| JP | 2015230401 A | 12/2015 |
| JP | 2017062376 A | 3/2017 |
| JP | 2017102386 A | 6/2017 |
| JP | 2017513969 A | 6/2017 |
| KR | 20110119360 A | 11/2011 |
| KR | 20140125632 A | 10/2014 |
| WO | 2017028423 A1 | 2/2017 |

* cited by examiner

STRUCTURAL COMPONENT AND MOBILE TERMINAL

CROSS-REFERENCE TO RELATED APPLICATIONS

This application is a National Stage of International Patent Application No. PCT/CN2017/114000 filed on Nov. 30, 2017, which is hereby incorporated by reference in its entirety.

TECHNICAL FIELD

This application relates to the field of mobile terminal technologies, and in particular, to a structural component and a mobile terminal.

BACKGROUND

A touch control liquid crystal display is usually designed in two manners: 1. A touch control function is implemented in a display. 2. A touch control metal wire is integrated into a thin film, and then the thin film is stuck to a display.

For the display in the second design, when the display is bonded to a housing of a mobile terminal, bonding performed through adhesive dispensing results in a problem that the touch control metal wire is broken and a touch control display cannot be detached and repaired. Therefore, an adhesive tape is usually used for bonding. However, with a gradual increase in designs of a display with a high screen-to-body ratio, a pure adhesive tape solution cannot meet bonding force for the touch control liquid crystal display, and the touch control liquid crystal display falls off during reliability testing.

SUMMARY

This application provides a structural component and a mobile terminal, to improve bonding strength between a display and a housing of a mobile terminal, and improve reliability of the mobile terminal.

According to a first aspect, a structural component is provided. The structural component includes a middle frame, a glass cover, and a touch control film. The glass cover and the touch control film are disposed in a stacked manner, and the touch control film is disposed on a surface that is of the glass cover and that faces the middle frame. A side edge of the touch control film and a side edge of the glass cover do not overlap completely. The surface that is of the glass cover and that faces the middle frame is exposed to the touch control film, and an exposed area of the glass cover is a first bonding area. A surface that is of the touch control film and that faces the middle frame is a second bonding area.

The first bonding area is adhesively connected to the middle frame by using first bonding adhesive, the second bonding area is adhesively connected to the middle frame by using second bonding adhesive, and bonding force of the first bonding adhesive is greater than bonding force of the second bonding adhesive.

In the foregoing implementation solution, the glass cover is bonded by using the first bonding adhesive, and the touch control film is bonded by using the second bonding adhesive. The first bonding adhesive is bonded to an edge of the glass cover, and the bonding force of the first bonding adhesive is greater than the bonding force of the second bonding adhesive. Therefore, bonding force between the glass cover and the middle frame is improved, and further reliability of the structural component that is in use is improved.

In a specific implementation solution, the first bonding area is disposed around the touch control film. Because the first bonding adhesive is disposed around the edge of the glass cover, bonding strength is improved.

In a specific embodiment solution, the first bonding adhesive is dispensed on the middle frame, and has a good bonding effect.

In a specific implementation solution, a protrusion structure is disposed on the middle frame, and the protrusion structure is adhesively connected to the first bonding area by using the first bonding adhesive. A distance between the middle frame and the glass cover is reduced by using the protrusion structure, so as to ensure that the first bonding area can be firmly bonded to the middle frame by using the first bonding adhesive.

In a specific embodiment solution, an adhesive overflow groove is disposed on the protrusion structure, to avoid that the first bonding adhesive overflows to an outer side of a display during adhesive dispensing.

In a specific embodiment solution, the protrusion structure and the middle frame are integrated as a whole. This facilitates production of the middle frame, and improves connection strength between the glass cover and the middle frame.

In a specific embodiment solution, the second bonding adhesive is foam adhesive, and has a good bonding effect.

In a specific embodiment solution, the structural component further includes a supporting protrusion disposed on the middle frame and configured to support the glass cover. Because the supporting protrusion supports the glass cover, stability of the glass cover is improved.

In a specific embodiment solution, the supporting protrusion is disposed on the protrusion structure, and is between the first bonding adhesive and the second bonding adhesive.

In a specific embodiment solution, the supporting protrusion and the middle frame are integrated as a whole. This reduces a connection between components, and improves stability of supporting the glass cover.

In a specific embodiment solution, the structural component further includes a flexible printed circuit board that is stacked with the touch control film, and the second bonding adhesive is located on one side of the flexible printed circuit board.

According to a second aspect, a mobile terminal is provided, and the mobile terminal includes the structural component according to any one of the foregoing implementations.

In the foregoing implementation solution, the glass cover is bonded by using the first bonding adhesive, and the touch control film is bonded by using the second bonding adhesive. The first bonding adhesive is bonded to the edge of the glass cover, and the bonding force of the first bonding adhesive is greater than the bonding force of the second bonding adhesive. Therefore, bonding force between the glass cover and the middle frame is improved, and further reliability of the structural component that is in use is improved.

DESCRIPTION OF EMBODIMENTS

To make the objectives, technical solutions, and advantages of this application clearer, the following further describes this application in detail with reference to the accompanying drawings. Certainly, the described embodiments are merely some rather than all of the embodiments of this application. All other embodiments obtained by a person of ordinary skill in the art based on the embodiments of this application without creative efforts shall fall within the protection scope of this application.

Figure 1:
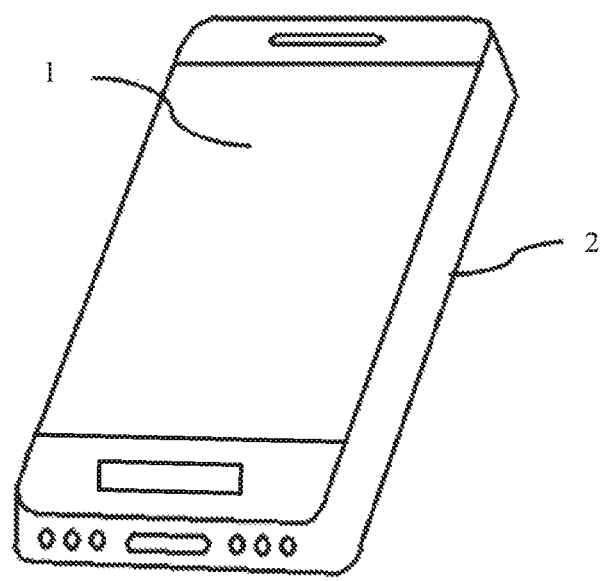
FIG. 1 is a schematic structural diagram of a mobile terminal according to an embodiment of this application.

In the embodiments of this application, to resolve a prior-art problem that bonding reliability of a display is insufficient, a structural component is provided. The structural component is in a mobile terminal, and the mobile terminal may be common in the prior art, for example, a mobile terminal such as a mobile phone, a tablet, or a laptop that has a screen. FIG. 1 is a schematic structural diagram of a mobile terminal according to an embodiment of this application. The mobile terminal provided in this embodiment of this application includes a middle frame 2 and a display 1. The structural component provided in this application improves a manner of bonding the display 1 and the middle frame 2, to improve bonding strength when the display 1 is connected to the middle frame 2, so that reliability of the structural component is improved.

Figure 2:
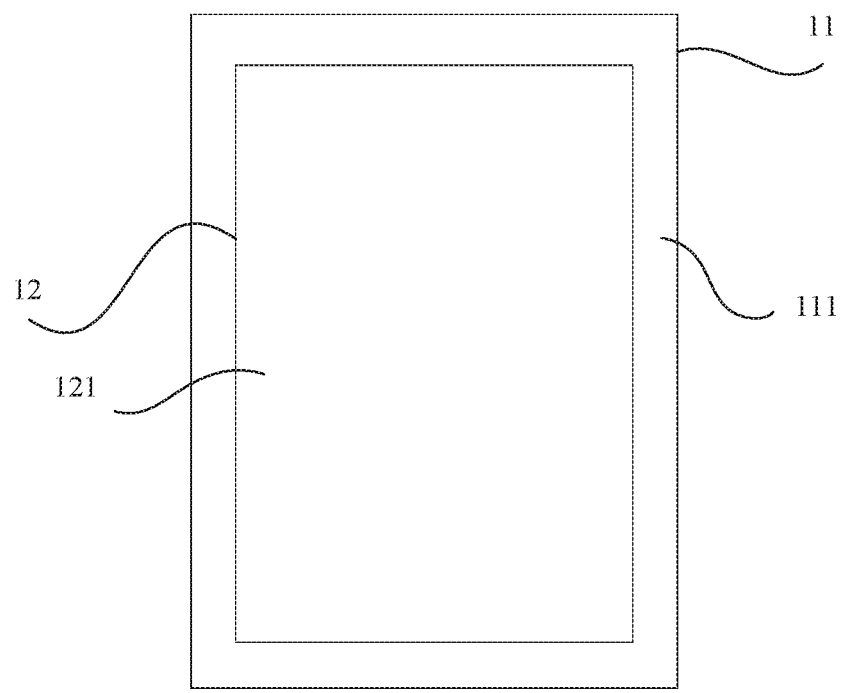
FIG. 2 is a schematic structural diagram of a display of a structural component according to an embodiment of this application.
Figure 3:
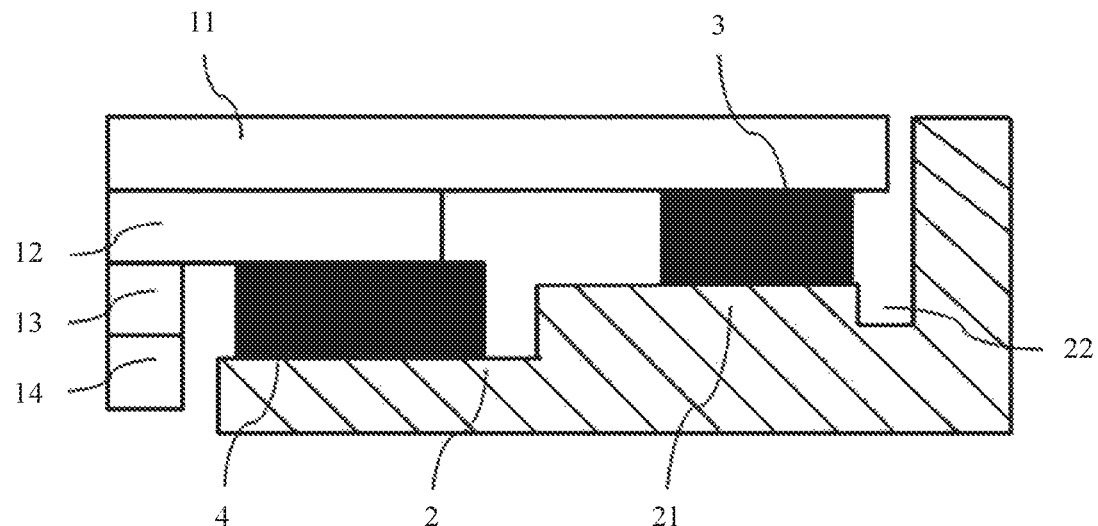
FIG. 3 is a schematic diagram of assembly of a glass cover and a middle frame of a structural component according to an embodiment of this application.

FIG. 2 is a schematic structural diagram of a display 1 of a structural component according to an embodiment of this application. The display 1 includes a glass cover 11 and a touch control film 12 that are stacked, and the touch control film 12 is disposed on a surface that is of the glass cover 11 and that faces a middle frame 2. In addition, as shown in FIG. 3, the display 1 further includes structures such as a flexible circuit board 13 and a thin film transistor 14 that are of a display 1 in the prior art. Details are not described herein.

During specific disposition, a side edge of the touch control film 12 and a side edge of the glass cover 11 do not overlap completely. In addition, a vertical projection that is of the touch control film 12 and that is on a plane on which the glass cover 11 is located is in a vertical projection that is of the glass cover 11 and that is on the plane on which the glass cover 11 is located. For details, refer to FIG. 2. FIG. 2 shows a stacking manner in which the side edge of the touch control film 12 and the side edge of the glass cover 11 do not overlap completely. When the stacking manner is used, the surface that is of the glass cover 11 and that faces the middle frame 2 is exposed to the touch control film 12.

An exposed area of the glass cover 11 is a first bonding area 111, and the first bonding area 111 is used to be connected to the middle frame 2. In addition, a surface that is of the touch control film 12 and that faces the middle frame 2 is a second bonding area 121, and the second bonding area 121 is also used to be connected to the middle frame 2. A manner shown in FIG. 2 may be used when the first bonding area 111 and the second bonding area 121 are specifically disposed. In this manner, the first bonding area 111 is disposed around the touch control film 12, so that when the first bonding area 111 is bonded to the middle frame 2, all edge areas of the glass cover 11 may be adhesively connected to the middle frame 2. Therefore, bonding strength between the glass cover 11 and the middle frame 2 is improved. In a specific disposing solution, widths of parts of the first bonding area 111 are equal. To be specific, widths of the first bonding area 111 that are on different sides of the touch control film 12 are the same, to further improve bonding stability of an edge of the glass cover 11. Certainly, because of a product requirement, the widths of the parts of the first bonding area 111 may alternatively be different. However, it should be ensured that when the first bonding area 111 is bonded to the middle frame 2, the glass cover 11 can be firmly bonded to the middle frame 2.

FIG. 3 is a schematic diagram of bonding between a display 1 and a middle frame 2 in a structural component according to an embodiment of the present invention. During specific bonding, as shown in FIG. 3, a first bonding area 111 is adhesively connected to the middle frame 2 by using first bonding adhesive 3, and a second bonding area 121 is adhesively connected to the middle frame 2 by using second bonding adhesive 4. Bonding force of the first bonding adhesive 3 is greater than bonding force of the second bonding adhesive 4. It can be learned from the structures shown in FIG. 2 and FIG. 3 that, when a glass cover 11 is bonded by using the first bonding adhesive 3 and a touch control film 12 is bonded by using the second bonding adhesive 4, the edge of the glass cover 11 is bonded by using the first bonding adhesive 3, and the bonding force of the first bonding adhesive 3 is greater than the bonding force of the second bonding adhesive 4. Therefore, bonding force between the glass cover 11 and the middle frame 2 is improved. In comparison with a prior-art solution in which only an adhesive tape is used to bond the display 1 and the middle frame 2, it can be learned that, when the display 1 provided in this embodiment of this application is bonded to the middle frame 2, bonding strength of an edge of the display 1 is enhanced, so that reliability of the structural component that is in use is further improved.

When the display 1 is specifically bonded to the middle frame 2, the first bonding adhesive 3 is dispensed on the middle frame 2. In other words, adhesive that can be used in an adhesive dispensing manner in the prior art is used as the first bonding adhesive 3. The second bonding adhesive 4 is foam adhesive. Common adhesive may be used as the first bonding adhesive 3, but the adhesive should have relatively strong bonding force, so that the glass cover 11 can be firmly bonded to the middle frame 2. While the foam adhesive has a good bonding effect, and is applicable to large-area bonding. In addition, when the display 1 is removed, the foam adhesive does not damage a touch control wire on the touch control film 12, so as to ensure security of the display 1 when the display 1 is detached.

When adhesive is used as the first bonding adhesive 3, a distance between the glass cover 11 and the middle frame 2 needs to be ensured, to ensure that a height of piled adhesive can be greater than the distance between the glass cover 11 and the middle frame 2 during adhesive dispensing. Therefore, when the glass cover 11 is placed, there can be a sufficient bonding area for the first bonding area 111 and the first bonding adhesive 3. To ensure the distance, a protrusion structure 21 is disposed on the middle frame 2 provided in this embodiment of this application. The protrusion structure 21 is disposed at a location opposite to the first bonding area 111. During bonding, the protrusion structure 21 is adhesively connected to the first bonding area 111 by using the first bonding adhesive 3. FIG. 3 is a schematic diagram showing that the protrusion structure 21 and the middle frame 2 are an integrated structure. When the middle frame 2 is being produced, the protrusion structure 21 is directly obtained through injection molding, so that when the middle frame 2 is connected to the glass cover 11, only bonding strength between the protrusion structure 21 and the glass cover 11 needs to be ensured. However, when the middle frame 2 and the protrusion structure 21 are a separated structure, connection strength between the glass cover 11 and the protrusion structure 21 and connection strength between the protrusion structure 21 and the middle frame 2 need to be ensured. Therefore, bonding stability between the glass cover 11 and the middle frame 2 can be effectively improved by using the integrated structure.

In addition, when the first bonding adhesive 3 is disposed in the adhesive dispensing manner, to avoid that the first bonding adhesive 3 overflows to the structural component when the glass cover 11 is bonded to the protrusion structure 21, an adhesive overflow groove 22 is disposed on the middle frame 2 provided in this embodiment of this application. As shown in FIG. 3, the adhesive overflow groove 22 is disposed on the protrusion structure 21. The adhesive overflow groove 22 is located on an outer side of a disposing area of the first bonding adhesive 3 (a side close to a side wall of the middle frame) on the protrusion structure 21. When the first bonding adhesive 3 flows, the first adhesive 3 directly flows into the adhesive overflow groove 22. Therefore, a case in which the first bonding adhesive 3 overflows to the structural component is reduced, and a bonding qualification rate is increased.

Figure 4:
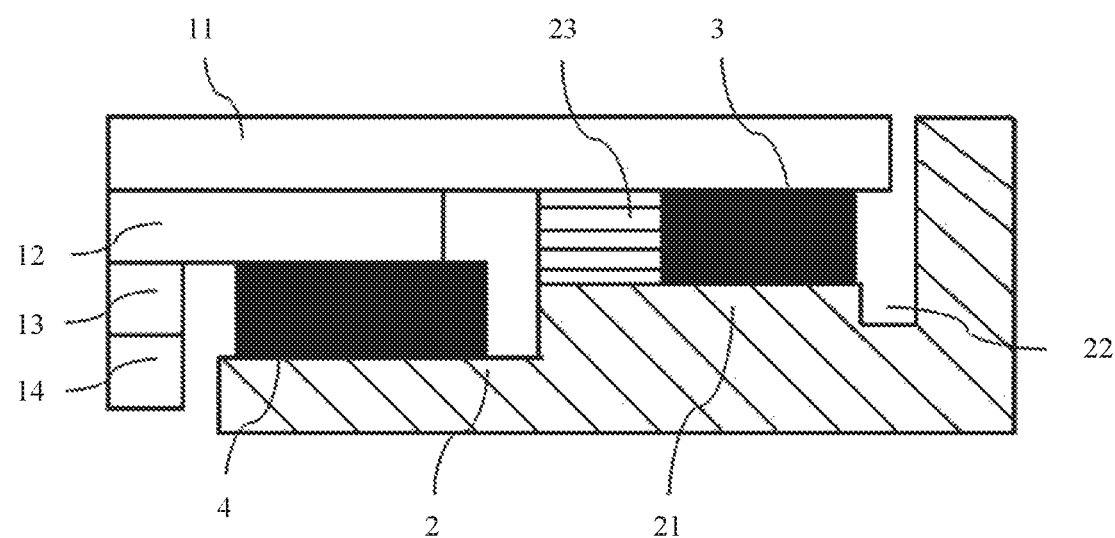
FIG. 4 is a schematic diagram of assembly of a glass cover and a middle frame of a structural component according to an embodiment of this application.

In the structural component shown in FIG. 3, to ensure a bonding effect of the display 1, a thickness of the first bonding adhesive 3 needs to be controlled by using a thickness of the second bonding adhesive 4. To be specific, a distance between the glass cover 11 and the protrusion structure 21 is controlled, to ensure that the glass cover 11 can be firmly connected to the protrusion structure 21 by using the first bonding adhesive 3. In an improved solution, to further improve bonding stability of the display 1, as shown in FIG. 4, a supporting protrusion 23 is disposed on a middle frame 2 provided in this embodiment of this application. The supporting protrusion 23 is disposed on the middle frame 2, and when a display 1 is installed, the supporting protrusion 23 is configured to press against a rear surface of the display 1, to support the display 1. Specifically, as shown in FIG. 4, the supporting protrusion 23 is disposed on a protrusion structure 21. In addition, when the supporting protrusion 23 is specifically disposed, the supporting protrusion 23 and the middle frame 2 may be an integrated structure, or the supporting protrusion 23 and the middle frame 2 may be a separated structure. In a specific implementation solution, the supporting protrusion 23 and the middle frame 2 are disposed as an integrated structure. In this case, the supporting protrusion 23, the protrusion structure 21, and the middle frame 2 may be produced in an integrated injection molding manner. As shown in FIG. 4, when specifically supporting the display 1, the supporting protrusion 23 presses against a first bonding area 111 of a glass cover 11. In this case, the supporting protrusion 23 is between first bonding adhesive 3 and second bonding adhesive 4. During adhesive dispensing, the first bonding adhesive 3 is piled in an included angle area formed by the supporting protrusion 23 and the protrusion structure 21, so that flow of the first bonding adhesive 3 is limited, and the first bonding adhesive 3 is easily to be piled. Therefore, a relatively small amount of the first bonding adhesive 3 can be used to firmly bond the glass cover 11.

Figure 5:
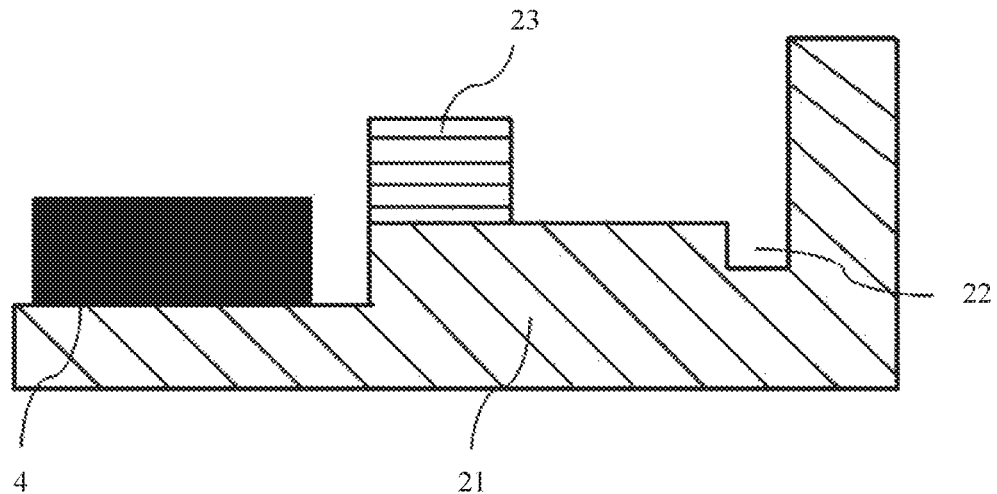
FIG. 5 to FIG. 7 are flowcharts of assembly of a glass cover and a middle frame according to an embodiment of this application.
Figure 6:
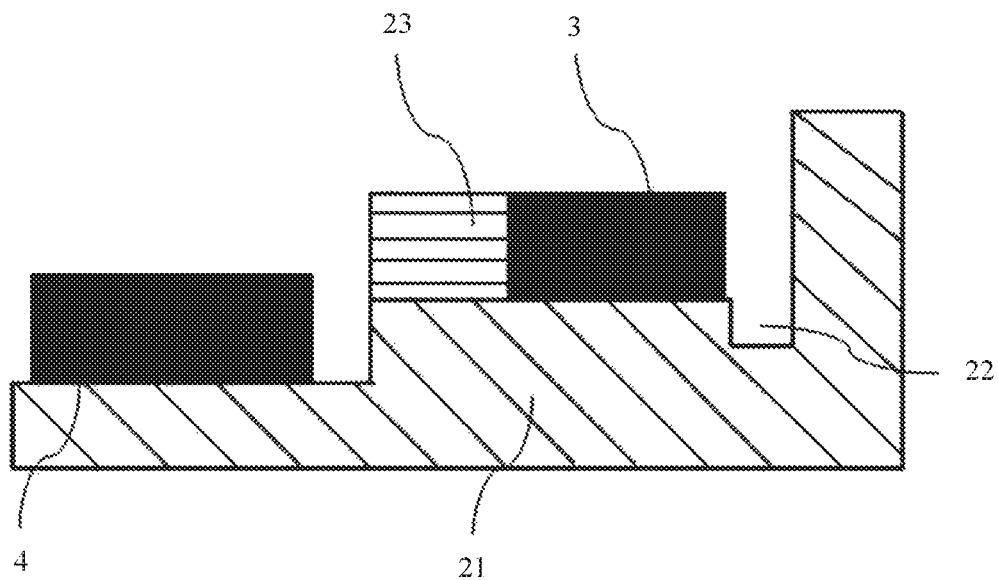
Figure 7:
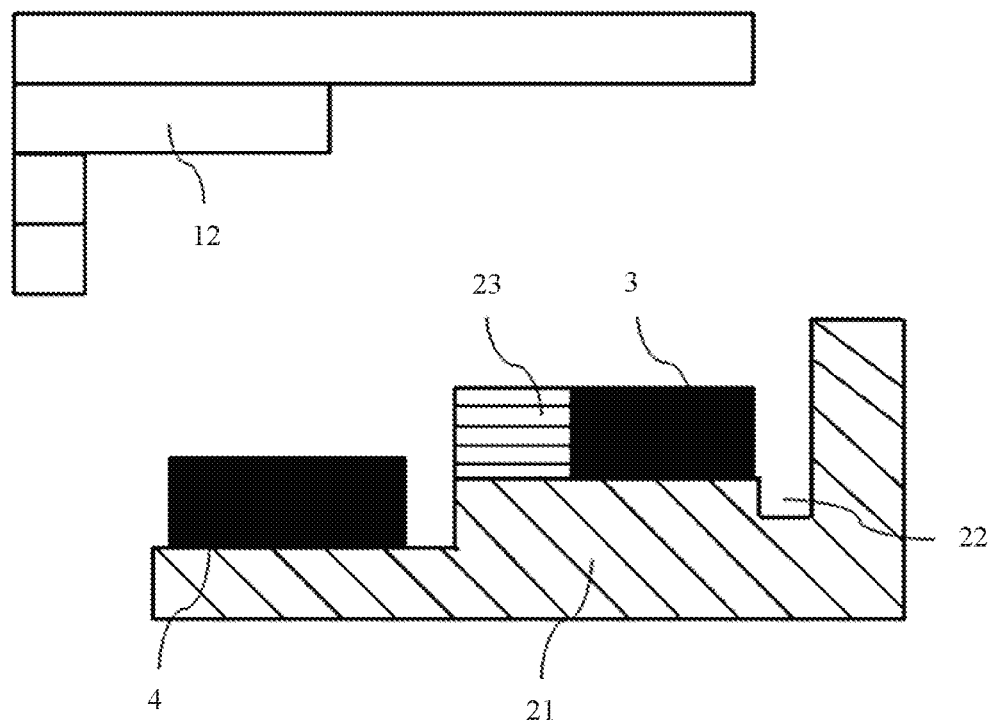

For ease of understanding the structural component provided in the embodiments of this application, that a middle frame 2 includes a protrusion structure 21 and a supporting protrusion 23 is used as an example. A procedure of producing the structural component provided in the embodiments of this application is described in detail in the following with reference to FIG. 5 to FIG. 7. As shown in FIG. 5, first, second bonding adhesive 4 is bonded to the middle frame 2, and a position at which the second bonding adhesive 4 is bonded corresponds to a position of a second bonding area 121 when a display 1 is placed in the middle frame 2. As shown in FIG. 6, first bonding adhesive 3 is disposed on the protrusion structure 21 of the middle frame 2 in an adhesive dispensing manner, and the first bonding adhesive 3 is disposed to correspond to a first bonding area 111. As shown in FIG. 7, the display 1 is placed in the middle frame 2. In this case, the first bonding area 111 is adhesively connected to the first bonding adhesive 3, and the second bonding area 121 is adhesively connected to the second bonding adhesive 4, so that the display 1 is installed. In this case, a touch control film 12 of the display 1 is connected to the middle frame 2 by using the second bonding adhesive 4, and an edge of a glass cover 11 is connected to the middle frame 2 by using the first bonding adhesive 3. This ensures a stable connection between the display 1 and the middle frame 2, and improves stability of the display 1 after the display 1 is installed.

Figure 8:
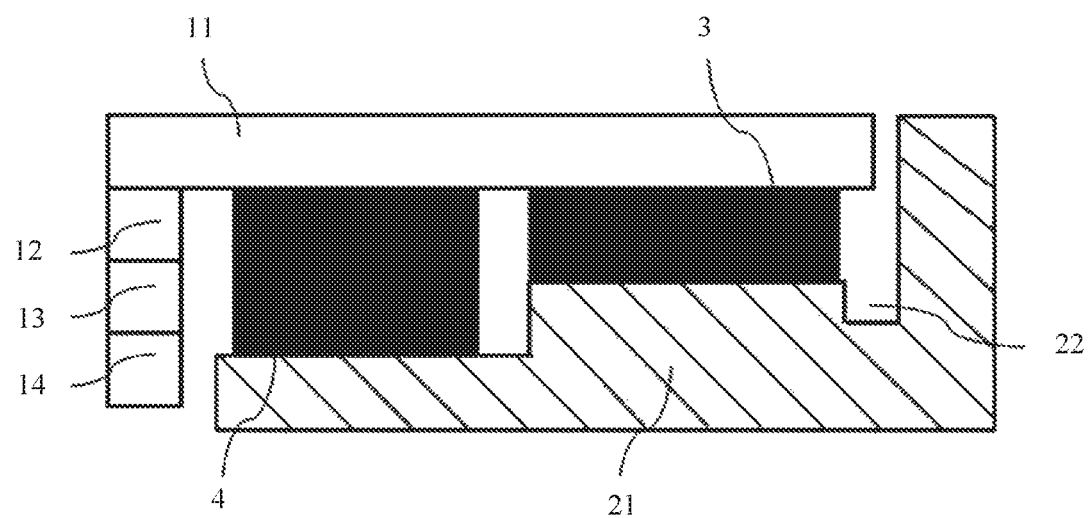
FIG. 8 is a schematic diagram of assembly of a glass cover and a middle frame of a structural component according to an embodiment of this application.
Figure 9:
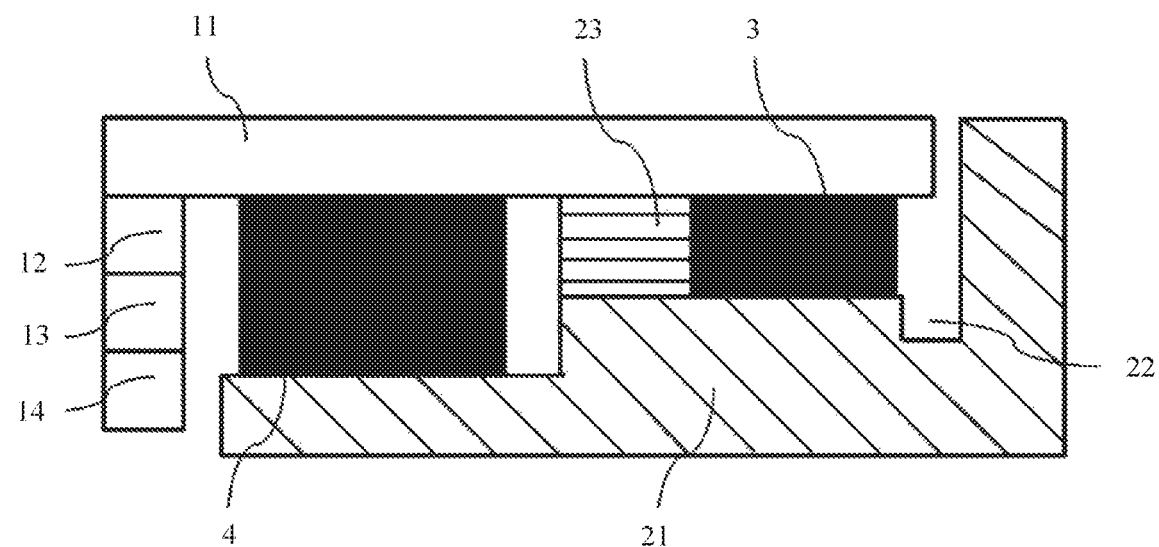
FIG. 9 is a schematic diagram of assembly of a glass cover and a middle frame of a structural component according to an embodiment of this application.

It can be learned from the foregoing description that, in the structural component provided in the embodiments of this application, two types of adhesive having different bonding strength are used to separately bond different areas of the display 1. Therefore, not only connection strength between the display 1 and the middle frame 2 can be ensured, but also security of the display 1 is ensured when the display 1 is detached. It should be understood that the structural component provided in the embodiments of this application is not limited to the structures shown in FIG. 3 and FIG. 4, and any solution in which two types of adhesive having different bonding strength are used to separately bond different areas of the display 1 can be applied to the embodiments of this application. As shown in FIG. 8 and FIG. 9, FIG. 8 and FIG. 9 show a specific deformation structure. In structures shown in FIG. 8 and FIG. 9, both first bonding adhesive 3 and second bonding adhesive 4 are adhesively connected to a first bonding area 111. In this case, a touch control film 12 is not bonded to a middle frame 2. In the structure, connection strength between a display 1 and the middle frame 2 can also be improved when the display 1 is installed, and security of the touch control film 12 can also be ensured when the display 1 is detached.

The present invention further provides a mobile terminal. The mobile terminal includes the structural component according to any one of the foregoing implementations, and the mobile terminal is a mobile terminal such as a mobile phone, a tablet, or a laptop that has a screen. When the foregoing structural component is used for the mobile terminal, in the structural component, a glass cover is bonded by using first bonding adhesive, and a touch control film is bonded by using second bonding adhesive. The first bonding adhesive is bonded to an edge of the glass cover, and bonding force of the first bonding adhesive is greater than bonding force of the second bonding adhesive. Therefore, bonding force between the glass cover and a middle frame is improved, and further reliability of the mobile terminal that is in use is improved.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A structural component, comprising:
   a middle frame;
   a glass cover comprising a glass cover surface that faces the middle frame, a glass cover side edge, and an exposed area that comprises a first bonding area, wherein the first bonding area is adhesively connected to the middle frame using a first bonding adhesive;
   a touch control film comprising a touch control film surface that faces the middle frame and a touch control film side edge;
   a protrusion structure disposed on the middle frame and adhesively connected to the first bonding area using the first bonding adhesive; and
   an adhesive overflow groove disposed on the protrusion structure,
   wherein the glass cover and the touch control film are disposed in a stacked manner,
   wherein the touch control film is disposed on the glass cover surface,
   wherein the touch control film side edge and the glass cover side edge do not overlap completely,
   wherein the glass cover surface is exposed to the touch control film,
   wherein the touch control film surface comprises a second bonding area,
   wherein the second bonding area is adhesively connected to the middle frame using a second bonding adhesive, and
   wherein a first bonding force of the first bonding adhesive is greater than a second bonding force of the second bonding adhesive.

2. The structural component of claim 1, wherein the first bonding area is disposed around the touch control film.

3. The structural component of claim 1, wherein the first bonding adhesive is dispensed on the middle frame.

4. The structural component of claim 3, wherein the protrusion structure and the middle frame are integrated.

5. The structural component of claim 1, wherein the second bonding adhesive is a foam adhesive.

6. The structural component of claim 1, further comprising a supporting protrusion that is disposed on the middle frame and that is configured to support the glass cover.

7. The structural component of claim 6, further comprising a protrusion structure disposed on the middle frame, wherein the supporting protrusion is disposed on the protrusion structure and is between the first bonding adhesive and the second bonding adhesive.

8. The structural component of claim 6, wherein the supporting protrusion and the middle frame are integrated as a whole.

9. A terminal, comprising:
   a structural component, comprising:
      a middle frame;
      a glass cover comprising a glass cover surface that faces the middle frame, a glass cover side edge, and an exposed area that comprises a first bonding area, wherein the first bonding area is adhesively connected to the middle frame using a first bonding adhesive;
      a touch control film comprising a touch control film surface that faces the middle frame and a touch control film side edge;
      a protrusion structure that is disposed on the middle frame and that is adhesively connected to the first bonding area using the first bonding adhesive; and
      an adhesive overflow groove disposed on the protrusion structure,
      wherein the glass cover and the touch control film are disposed in a stacked manner,
      wherein the touch control film is disposed on the glass cover surface,
      wherein the touch control film side edge and the glass cover side edge do not overlap completely,
      wherein the glass cover surface is exposed to the touch control film,
      wherein the touch control film surface comprises a second bonding area,
      wherein the second bonding area is adhesively connected to the middle frame using a second bonding adhesive, and
      wherein a first bonding force of the first bonding adhesive is greater than a second bonding force of the second bonding adhesive.

10. The terminal of claim 9, wherein the first bonding area is disposed around the touch control film.

11. The terminal of claim 9, wherein the first bonding adhesive is dispensed on the middle frame.

12. The terminal of claim 9, wherein the protrusion structure and the middle frame are integrated as a whole.

13. The terminal of claim 9, wherein the second bonding adhesive is foam adhesive.

14. The terminal of claim 9, wherein the structural component further comprises a supporting protrusion that is disposed on the middle frame and that is configured to support the glass cover.

15. The terminal of claim 14, wherein the structural component further comprises a protrusion structure disposed on the middle frame, and wherein the supporting protrusion is disposed on the protrusion structure and is between the first bonding adhesive and the second bonding adhesive.

16. The structural component of claim 14, wherein the first bonding adhesive is not in contact with the touch control film.

* * * * *

UNITED STATES PATENT AND TRADEMARK OFFICE
CERTIFICATE OF CORRECTION

PATENT NO. : 11,463,569 B2
APPLICATION NO. : 16/768494
DATED : October 4, 2022
INVENTOR(S) : Renwei Guo and Xixiang Dai It is certified that error appears in the above-identified patent and that said Letters Patent is hereby corrected as shown below:

In the Claims

Claim 4, Column 7, Line 53: "claim 3" should read "claim 1"

Signed and Sealed this
Thirteenth Day of December, 2022

Katherine Kelly Vidal
*Director of the United States Patent and Trademark Office*